Jan. 28, 1969  L. T. SKEGGS  3,424,557
AUTOMATIC ANALYSIS APPARATUS CONTROL MEANS
Filed Aug. 17, 1965
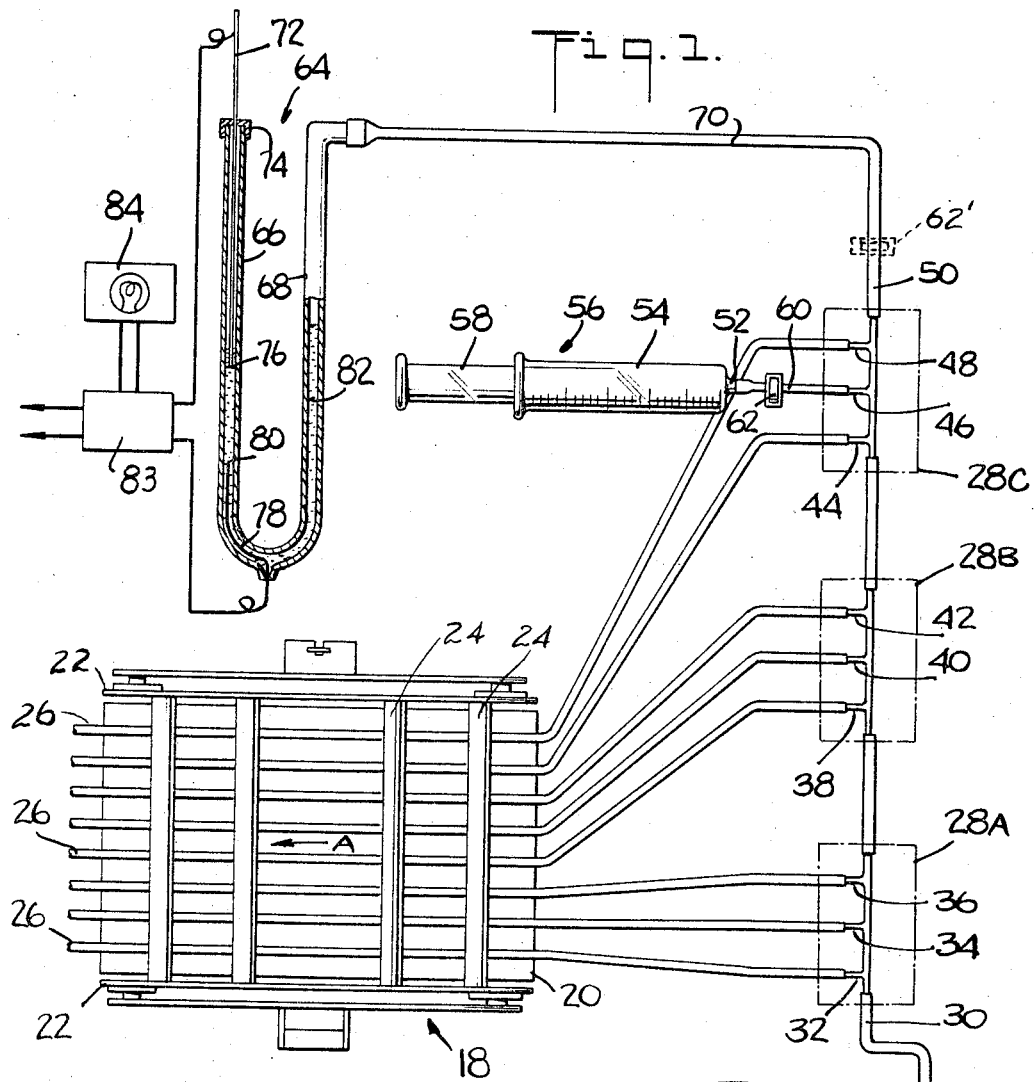
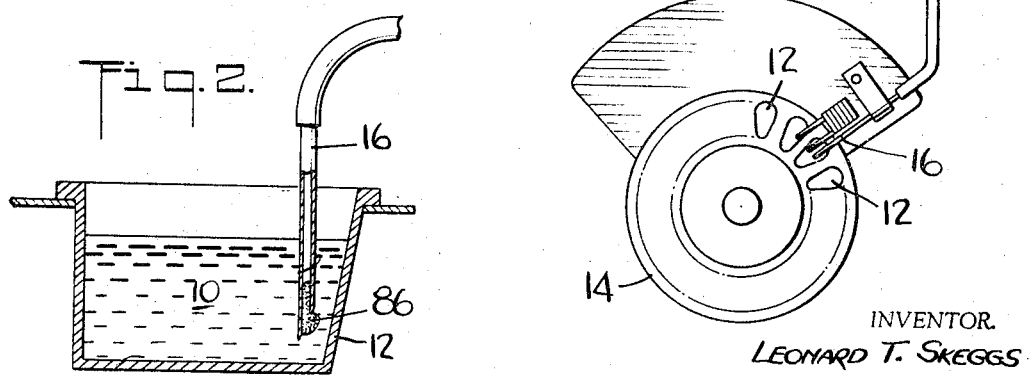
INVENTOR.
LEONARD T. SKEGGS
BY
ATTORNEY

United States Patent Office 3,424,557
Patented Jan. 28, 1969

3,424,557
AUTOMATIC ANALYSIS APPARATUS CONTROL MEANS
Leonard T. Skeggs, Kirtland, Ohio, assignor to Technicon Corporation, Chauncey, N.Y., a corporation of New York
Filed Aug. 17, 1965, Ser. No. 480,456
U.S. Cl. 23—253
Int. Cl. G01m 1/02, 33/16
6 Claims

ABSTRACT OF THE DISCLOSURE

An automatic, multiple channel, sequential sample, analysis system includes a sample off-take tube coupled to a sample stream dividing conduit which in turn is coupled to a plurality of peristaltic pump tubes. A monometer is coupled to the conduit to detect and signal fall in pressure due to a stoppage in the off-take tube. A source of wash liquid is also coupled to the conduit for back flushing a stoppage to the off-take tube.

---

This invention relates to the automatic, continuous analysis of liquids, and, more particularly, to an apparatus for detecting clots or failures in the device for off-taking samples into the apparatus.

Apparatuses for the automatic, continuous analysis of liquids are well known. Such an apparatus is shown in my U.S. Patent No. 2,797,149, issued June 25, 1957. The analysis apparatus is fed sequential samples as a continuous stream by means of an off-take device which aspirates liquid from each of a plurality of sample containers, which are sequentially presented thereto by a sampler assembly, as shown in my U.S. Patent No. 2,879,141, issued Mar. 24, 1959. More recently, apparatus has become known wherein the initial continuous stream of samples is divided into a plurality of quotient streams each containing a fractional portion of each sample from the initial stream. Each quotient stream is then analyzed, and the results are recorded in correlation automatically. Such an apparatus is discussed in "Multiple Automatic Sequential Analysis," Clinical Chemistry, vol. 10, No. 10, October 1964, pp. 918–936, by L. T. Skeggs, Jr., and H. Hochstrasser.

Most often the sample fluids which are being analyzed are of human origin, such as blood. Such fluids occasionally include clots of non-liquid material, which, if carried into the apparatus, might cause a stoppage of flow therein. Such a stoppage would only be visible immediately to the operator by continuous visual inspection of all parts of the apparatus; or would be visible ultimately by unreasonable results indicated by the recorder. In such an event, all of the samples between the time of stoppage within the system and its discovery and correction by the operator would be lost. Such samples, if replacable at all, would probably only be replacable at great inconvenience.

Generally such stoppages occur in the off-take tube itself. Customarily the off-take tube has the smallest internal diameter of the system, e.g., a 22 gage syringe needle having a 0.015 inch internal diameter.

It is, therefore, an object of this invention to provide an apparatus for immediately detecting and indicating stoppages in the off-take tube.

Another object is to provide an apparatus having a detector which will not contaminate the sample flowing through the apparatus.

Yet another object is to provide an apparatus having means for ejecting a clot from the off-take tube.

A feature of this invention is the provision of a manometer coupled to a junction between the outlet of the off-take tube and the pump tube for the sample liquid.

These and other objects, features and advantages will be apparent upon consideration of the following disclosure taken in conjunction with the accompanying, drawing in which:

FIG. 1 is a schematic diagram of an embodiment of this invention; and

FIG. 2 is a view in elevation in cross-section of a detail of a sample liquid supply container and a sample liquid off-take tube.

The individual liquid samples 10 are respectively disposed in a plurality of containers 12 which are carried by an intermittently rotating tray 14. The tray sequentially presents each container to an off-take station at which an off-take tube 16 is carried by a suitable support mechanism. The support mechanism inserts the end of the off-take tube into the presented container, maintains it therein for an interval of time to permit the aspiration of the sample therethrough, and removes it from the container to await the next successive container. The particular sampler herein briefly shown is more completely described in U.S. Patent No. 3,230,766, issued Jan. 25, 1966, to Jack Isreeli and Theodore Bilichninsky.

The sample is aspirated through the off-take tube 16 by a pump 18. The pump briefly shown here is of the type more completely described in U.S. Patent No. 2,935,028, issued May 3, 1960, to Andres Ferrari, Jr. and Jack Isreeli. The pump 18 comprises a housing in which is disposed a motor. On top of the housing is mounted a pressure plate 20. Above the pressure plate are two endless chains 22 which carry a plurality of spaced apart rollers 24 and are driven by the motor. A plurality of pump tubes 26 are disposed in side by side relationship between the pressure plate 20 and the rollers 24. Each roller in cyclical sequence is carried by the chains to engage, progressively occlude, and to release all of the pump tubes. The direction of progressive occlusion is shown by the arrow A.

The off-take tube is coupled to several of the pump tubes by a junction means, here shown to comprise three junction blocks 28A, 28B and 28C. These junction blocks are coupled in series to provide a conduit having an inlet 30, and ten outlets 32, 34, 36, 38, 40, 42, 44, 46, 48, and 50. The inlet 30 is coupled to the outlet of the off-take tube 16. The outlets 32, 34, 36, 38, 40, 42, 44, and 48 are coupled to the inlets of respective pump tubes 26; by which arrangement the initial stream of sequential samples from the off-take tube 16 is divided into eight quotient streams of sequential portions of samples.

The outlet 46 is coupled to the end 52 of the cylinder 54 of a syringe 56 having a piston 58 by means of resiliently compressible tube 60. A pinch-clamp 62 is clamped onto the tube 60 to normally preclude the flow of fluid therethrough.

A manometer 64 is formed by a "U" shaped tube having a left leg 66 and a right leg 68. The upper end of the leg 68 is coupled by a tube 70 to the outlet 50. A first electrode 72 passes through an end cap 74 fitted to the upper end of the leg 66 into the leg 66. The electrode is adjustable in height through the cap, so that the bottom end 76 of the electrode may be adjustably positioned. A second electrode 78 is sealed through the bottom of the manometer, and has a fixedly located upper end 80. A supply of mercury 82 is disposed in the tube. The two electrodes 72 and 78 are coupled to a control device 83, such as a relay, which is powered by a source of energy, not shown, and is adapted to energize an indicator 84, such as a light.

The peristaltic pump 18 during normal operation develops a relatively constant pressure in the conduit formed by the junction blocks 28A, 28B and 28C. While fluid is being drawn, this is normally two to three inches of mercury vacuum; while air between samples is being drawn, this is normally 1.8 inches of mercury vacuum. The electrode 72 is adjusted in height so that the column of mercury electrically connects the end 76 of the electrode 72 with the end 80 of the electrode 78, maintaining the indicator 84 in its deactuated condition. Should a clot 86 cause a stoppage in the off-take tube 16, as shown in FIG. 2, the pressure in the conduit formed by the junction blocks 28A, 28B and 28C will fall, to five to twelve inches of mercury vacuum, causing the column of mercury 82 to shift from the left tube 66 of the manometer to the right tube 68, electrically disconnecting the electrodes 72 and 78, and causing the controller 83 to actuate the alarm 84. The operator can then quickly manually remove the off-take tube 16 from the sample container 12, and then either pull the clot 86 off with his fingers, or remove the off-take needle and wire out the clot. If, however, the clot is upstream of the off-take needle, the operator will clamp a pinch clamp 62' on the tube 50, remove the pinch clamp 62 from the tube 60 and backflush the conduit with a fluid contained in the syringe 56. While water may be contained in the syringe and will provide the necessary back pressure, a 0.1 N sodium hydroxide solution is preferred. After backflushing, the clamp 62 is replaced on the tube 60 and the clamp 62' is removed. In lieu of the two pinch clamps 62 and 62', a two way valve, not shown, may be used to alternatively couple the tubes 50 and 60 to the block 28C.

It is preferred to have the operator take immediate action manually without shutting down the system; however, the controller 83 can be coupled to the drive means for the sampler, pump and recorder to halt the entire system. Subsequently, the operator can clean out the clot.

It will be noted that the outlet 48 is coupled to a pump tube 26 which is not utilized for analysis, but rather is coupled to a waste receiver. The flow of the quotient sample stream through the outlet 48 precludes the possibility of contamination by the fluid in the tube of the quotient sample streams flowing in the conduit provided by the junction blocks 28A, 28B and 28C which are upstream of the outlet 48.

While there has been shown and described a preferred embodiment of the invention, it will be understood that the invention may be embodied otherwise than is herein specifically illustrated and described, and that certain changes in the form and arrangement of parts and in the specific manner of practicing the invention may be had without departing from the underlying ideas or principles of this invention within the scope of the appended claims.

What is claimed is:

1. In an automatic analysis apparatus comprising:
   supply means for providing a liquid sample as a flowing stream;
   conduit means having an inlet coupled to said supply means for receiving the sample stream therefrom and having an outlet (44); and
   pump means fluid coupled to said outlet (44) of said conduit means for drawing the sample through said conduit means and thence to analysis means; the improvement of
   pressure sensing means fluid-coupled to said conduit means for detecting a change in the pressure in said conduit means, which change is responsive to a stoppage in the flow of the sample stream through said conduit means.

2. Apparatus according to claim 1 characterized in that said pressure sensing means provides a signal upon the fall of pressure in said conduit means to a predetermined level.

3. Apparatus according to claim 1 characterized in that conduit means includes
   a first outlet downstream of said inlet, which serves as the outlet for conveying sample to the analysis means,
   a second outlet downstream of said first outlet, and
   a third outlet downstream of said second outlet;
   said pump means having a first pump tube coupled to said first conduit outlet for drawing a quotient of the sample stream therefrom to the analysis means, and having a second pump tube coupled to said second conduit outlet for drawing a quotient of the sample stream therefrom; and
   said pressure sensing means is coupled to said third conduit outlet for providing a signal upon the fall of pressure in said conduit means to a predetermined level;
   said second pump tube discharging its quotient sample stream to waste, whereby such stream serves to isolate, with respect to sample flow, said first conduit outlet from said third conduit outlet.

4. Apparatus according to claim 3 characterized in that said pressure sensing means includes
   a mercury manometer including,
   a tube containing mercury and having two electrical conduits disposed therein and longitudinally spaced apart;
   said mercury contacting both of said contacts during normal pressure in said conduit means;
   said mercury shifting away from one of said contacts when the pressure in said conduit means falls to said predetermined level.

5. Apparatus according to claim 3 characterized in a fourth outlet in said conduits; and
   a source of wash liquid to said fourth outlet of said conduit means and adapted to provide a flow of wash liquid through said conduit means and out said supply means (16) in a direction of flow opposite to the normal flow, whereby an obstruction in said supply means causing a fall in pressure in said conduit means may be reverse-flushed out.

6. Apparatus according to claim 5 characterized in that said pressure sensing means is coupled to said third outlet by a normally open valve means (62'), and said wash liquid source is coupled to said fourth outlet by a normally closed valve means (62).

References Cited

UNITED STATES PATENTS

| 2,011,393 | 8/1935 | Bradley | 222—60 X |
| 2,920,159 | 1/1960 | Snyder | 73—401 |
| 3,241,923 | 3/1966 | Ferrari | 23—253 |

MORRIS O. WOLK, *Primary Examiner.*

ELLIOTT A. KATZ, *Assistant Examiner.*

U.S. Cl. X.R.

222—52; 167—84.5